July 23, 1968     B. R. BETTER     3,393,577

PRE-LOADED BALL SCREW ASSEMBLY

Filed June 29, 1966     4 Sheets-Sheet 2

Inventor
Bernard R. Better

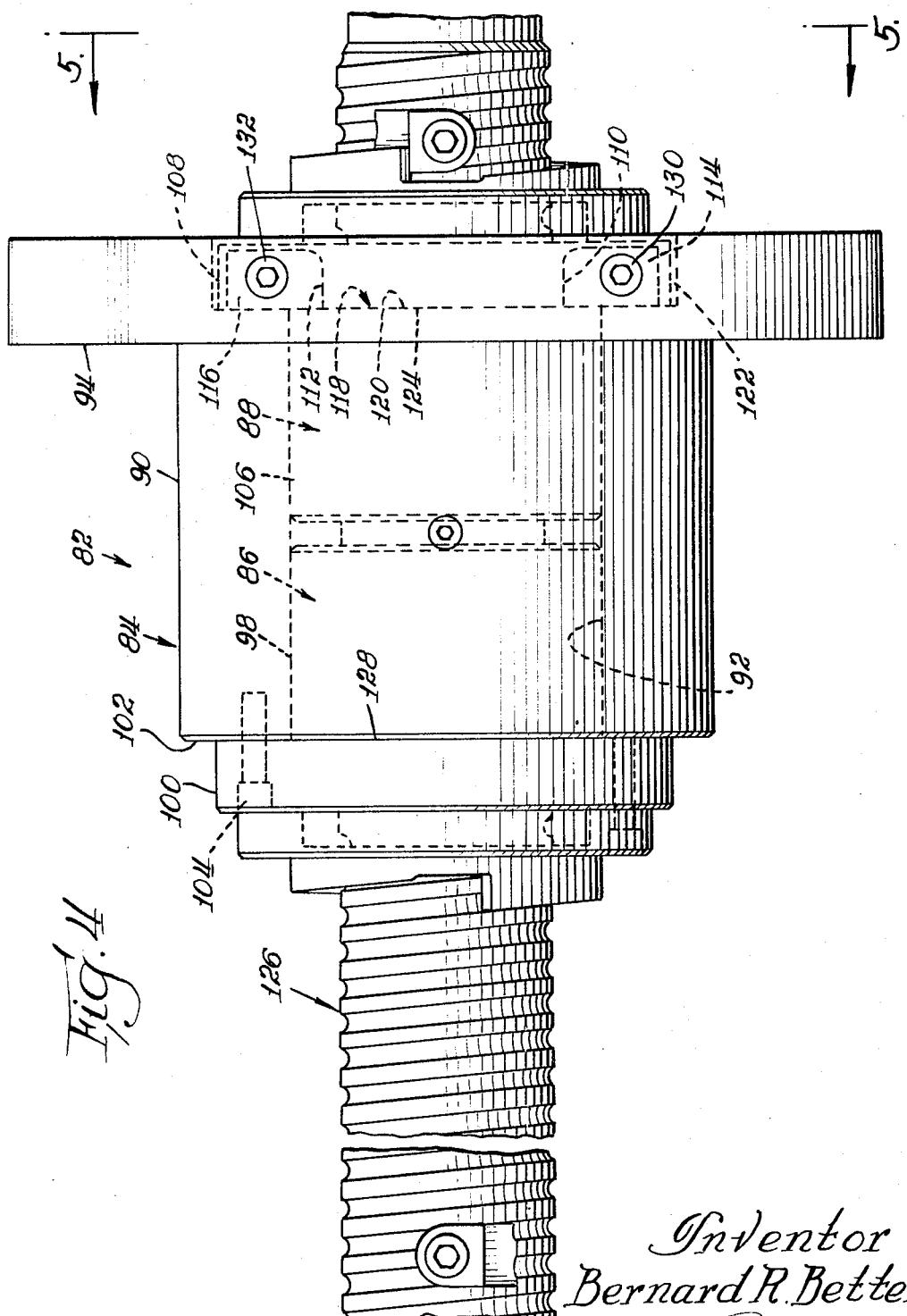

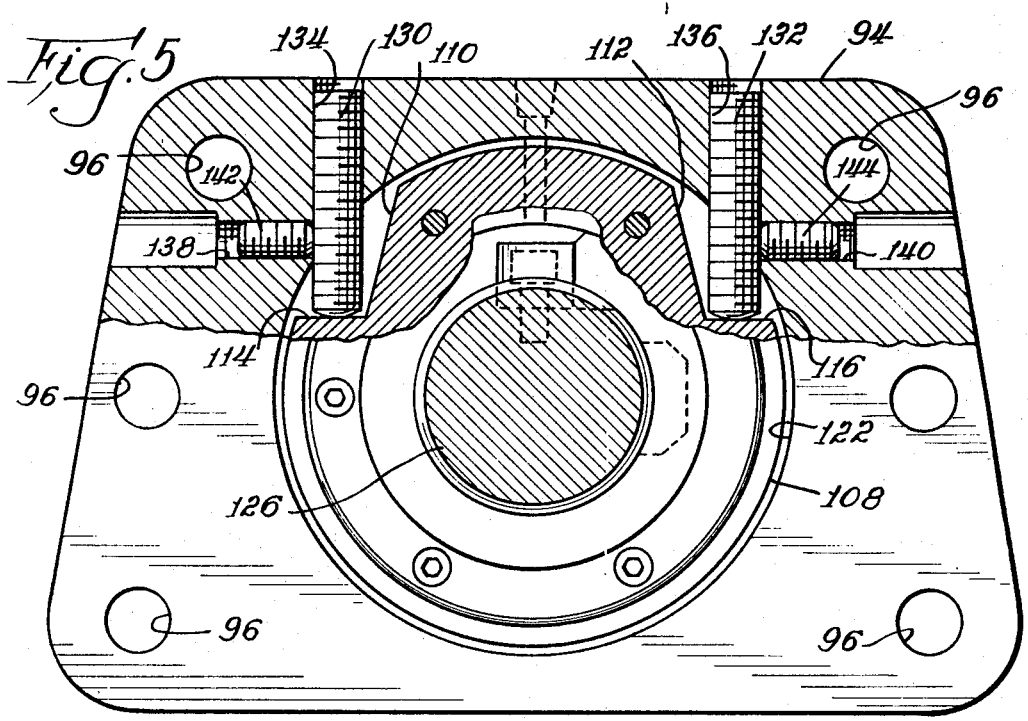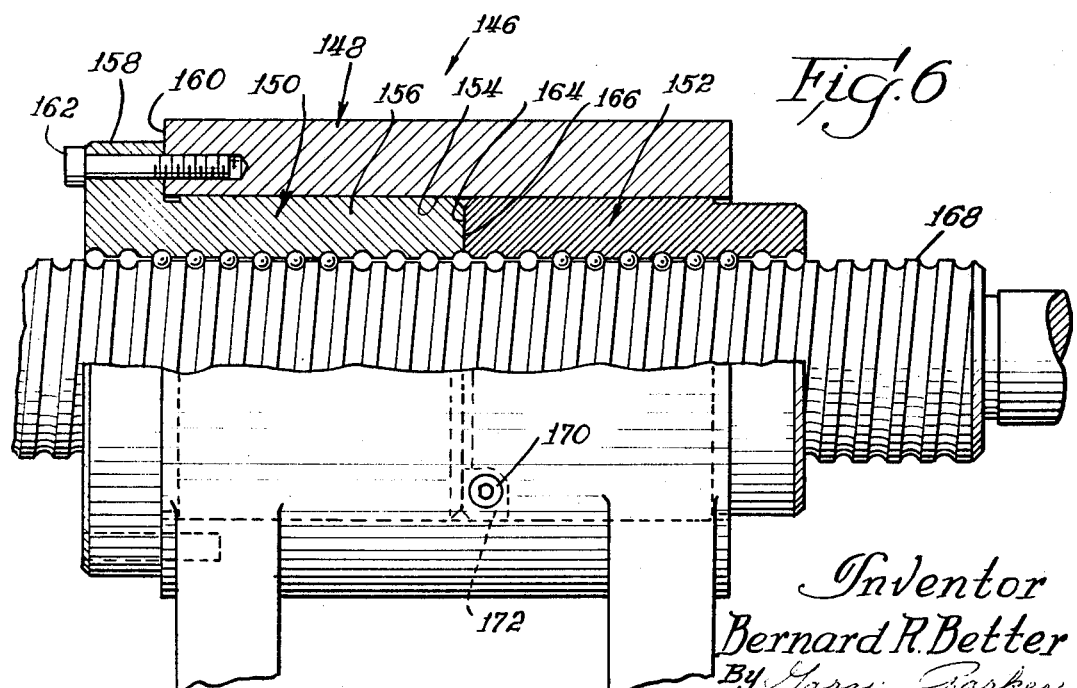

United States Patent Office

3,393,577
Patented July 23, 1968

3,393,577
PRE-LOADED BALL SCREW ASSEMBLY
Bernard R. Better, Chicago, Ill., assignor to Scully-Jones Company, Chicago, Ill., a corporation of Delaware
Filed June 29, 1966, Ser. No. 561,422
9 Claims. (Cl. 74—424.8)

ABSTRACT OF THE DISCLOSURE

A ball screw assembly having improved means for axially pre-loading a pair of nut members on a screw member to produce a predetermined pre-load force between the nut and screw members including improved adjusting screw means for adjusting the magnitude of the pre-load force.

---

The present invention relates to a ball screw assembly including a pair of nut members rotatably mounted on a screw member and interconnected therewith by a plurality of ball circuits, and in particular to improved means for axially pre-loading the nut members on the screw member and for adjusting the magnitude of the pre-load forces.

Ball screws have come into ever increasing use in recent years and have been found to offer significant advantages in a great many different applications where it is desired to convert rotary motion to linear motion or vice versa with a minimum of friction and wear. In a large number of such applications it is important that there be an accurately predetermined relationship between the screw and nut members so that upon a given number of rotations of the nut member relative to the screw member, or vice versa, there will be a precisely predetermined axial relationship between the nut and screw members and whichever member is axially movable can be precisely located in a given axial position. If the nut member is not pre-loaded relative to the screw member, the small clearances between the balls and the sides of the nut grooves and screw grooves in which the balls travel will produce backlash so that an axial load on one of the members such as the nut will produce a relative axial movement between the nut and the screw.

It is known that if two nuts are mounted on the screw member of a ball screw assembly in end-to-end abutted relation and pre-loaded so as to have a light axial pressure at their interface, then backlash will be eliminated. With such a pre-loaded ball screw assembly, an external axial load on the nuts will increase the load on the balls in one of the nuts and reduce the load on the balls in the other nut, inasmuch as the pre-load forces on the two nuts are in opposite directions. Thus, one of the two nuts will carry the external axial load, while the other simply acts as a pre-loading nut, and of course if the direction of the external load is reversed then the alternate one of the nuts will function to carry the load. If the nut which is functioning to carry the external load is not sufficiently rigid so as to prevent the pre-load on the adjacent nut from being reduced to zero, then the pre-loaded portions of the grooves in the latter nut will no longer contact the balls therein. The latter occurrence is known as "lift-off," and normally it is an objective to avoid the occurrence of "lift-off" since such a phenomenon defeats the purpose of pre-loading and permits relative axial movement of the nut and the screw when the direction of the external load is reversed, just as when blacklash is present.

Another objective in the pre-loading of a ball screw assembly is to minimize the effects of deformation of the ball screw components when subjected to axial loads. Thus, the balls themselves deflect under load, as do the nut and screw members. It is characteristic of most ball screws that for smaller loads a given increase in load will produce a relatively high deflection, whereas in higher load ranges the same increase in load will produce a smaller corresponding increase in deflection. This is due in part because under a light load a ball has almost point contact and a given increase in load will cause a relatively high deflection or deformation of the ball, whereas after the contact areas of the balls have increased substantially, i.e. flattened out, a given load increase will not produce as great a deflection, and in the latter situation the load deflection curve more closely approximates a linear function. By proper pre-loading of a ball screw assembly it is possible to produce the initial relatively high deformation of the balls by pre-loading, so that when an external load is applied to the pre-loaded ball screw the deflection of the latter will be minimized and will exhibit approximately linear load-deflection characteristics. Moreover, where a ball screw assembly is provided with two nuts pre-loaded against one another, it is normally desirable that the two nuts be substantially identical since upon a reversal of the external axial load a different one of the nuts will carry the load, and unless the two nuts exhibit the same characteristics, the ball screw assembly will have a different stiffness depending upon the direction of the load.

In determining the optimum amount of pre-loading, it will be understood that an excessively large pre-load is undesirable because this produces appreciable wear on the ball screw components even when there is little or no external load on the ball screw. Thus, it is desirable to select a pre-load which accomplishes the intended objectives without detracting unnecessarily from the useful life of the ball screw. Normally, the principal objectives of pre-loading are to eliminate back lash, to produce a certain required stiffness, in some cases to limit maximum deflection to a certain value at a predetermined load, and often a combination of the foregoing objectives. By way of example, it will be understood that where elimination of backlash is the primary objective, a very light pre-load will accomplish such an objective and yet detract very little from the useful life of the ball screw assembly. A substantially greater pre-load may of course be required in order to meet various other more sereve requirements as to stiffness or as to a maximum deflection at a given load.

Another objective in most ball screw applications is to prevent lift-off of the nut which is functioning as the pre-load nut, since as previously explained the occurrence of lift-off will produce a backlash effect when the direction of load is reversed. With most ball screws a pre-load on the general order of one-third of the anticipated maximum external load will prevent lift-off at such load. It is possible to plot a load-deflection curve for a given ball screw and nut assembly which is not pre-loaded, select a tentative pre-load which is roughly one-third of the anticipated maximum external load, shift the load-deflection curve along the load axis in accordance with the magnitude of the pre-load, note the deflection indicated at the value of the anticipated maximum load, and note the pre-load deflection where the load-deflection curve for the pre-loaded nut and screw combination crosses the zero load line. If the pre-load deflection exceeds the deflection indicated at the anticipated maximum load, then such maximum load will not cause lift-off, whereas if the pre-load deflection is less than the deflection at the maximum anticipated load, then a somewhat higher pre-load will be required to prevent lift-off.

The foregoing discussion is to indicate that in many applications the magnitude of the pre-load is extremely important and is preferably determined in accordance with the particular ball screw characterictics required for a given application. The magnitude of the pre-load must be carefully adjusted by the manufacturer, and often subsequent adjustment in the field may be found desirable in order to obtain optimum operating characteristics in accordance with the use to which a ball screw assembly is put.

While the advantages of pre-loading a ball screw are generally known in the art, the particular devices heretofore developed for producing such pre-loading have suffered from significant disadvantages, particularly with respect to the difficulty involved in adjusting the magnitude of the pre-load. For example, one known form of pre-loaded ball screw assembly comprises a housing having a plurality of internal spline teeth at each end thereof, and a pair of nuts positioned within the housing and each having external spline teeth for cooperation with the internal spline teeth at a corresponding end of the housing. For purposes of illustration, there might be fifty spline teeth on one of the nuts and at a corresponding end of the housing, and fifty-one spline teeth on the other nut and at the other end of the housing. The two nuts are located within the housing and are arranged in a predetermined rotary position relative to one another. The two nuts are held in such a relative position by their splined connections to the housing so that when the screw member is threaded through the nuts the latter will abut against one another or against a portion of the housing and thereby have a pre-load exerted upon them. In the examples given above there are fifty teeth at one end of the housing and fifty-one teeth at the other end, and thus by disassembling the ball screw assembly and turning each nut by one tooth it is possible to make a slight adjustment in the relative rotary position of the two nuts and thus in the magnitude of the pre-load. Accordingly, the foregoing arrangement permits adjustment of the magnitude of the pre-loading forces, but the screw member must be removed and the ball screw device disassembled in order to change the pre-load after the ball screw has once been assembled. Moreover, difficulty may be encountered in the threading of the screw into the nut members since it is during this operation that the pre-load forces are actually developed.

Another known method of pre-loading a ball screw assembly comprises assembling the two nut members on a ball screw, interconnecting the two nut members so that they canot rotate relative to one another, and then forcing shim plates or spacers or the like between the two nut members so as to force them apart and thereby develop a pre-load on the nuts. With the latter technique it is possible to adjust the pre-load without removing the screw member from the ball screw assembly. However, it is extremely difficult and time consuming to produce with any accuracy a given magnitude of pre-load since the latter is dependent upon the thickness of the shim plates being used. It is also known to simply position two ball nuts on a ball screw member, rotate one nut against the other to develop a pre-load, and then use a radial pin or other suitable means for locking the two nuts together in their pre-loaded position. The latter technique does not however permit easy adjustment of the magnitude of the pre-load.

It will be understood from the foregoing that with the ball screw pre-loading devices which have heretofore been in common commercial use it is usually extremely difficult and time-consuming to adjust the magnitude of the pre-load. In many cases it is necessary to remove the screw member in order to make such an adjustment and it is often impossible to make an accurate adjustment in very fine controlled increments.

It is therefore an object of the present invention to provide a ball screw assembly having improved pre-loading means which overcomes the foregoing disadvantages of the devices heretofore known.

A more specific object of the present invention is to provide a ball screw assembly including pre-loading means which permits adjustment of the magnitude of the pre-load without removing the screw member.

Another of my objects is to provide a ball screw assembly having pre-loading means which permits adjustment of the pre-load without need for fitting spacer washers or shims or the like during assembly.

An additional object is to provide a ball screw assembly as above-mentioned where the magnitude of the pre-load forces can be adjusted in fine increments and with great accuracy, and where such adjustment can be accomplished with a minimum of time and effort.

A further object of the invention is to provide a ball screw assembly which permits adjustment of the magnitude of the pre-load force without removal of the ball screw assembly from the machine in which it is incorporated.

The foregoing and other objects and advantages of the invention will be apparent from the following description thereof.

Now, in order to acquaint those skilled in the art with the manner of making and using my invention, I shall describe, in conjunction with the accompanying drawings, the best mode contemplated by me of carrying out the invention.

In the drawings:

FIGURE 4 is a side elevational view, partly broken away, showing an alternative form of pre-loaded ball screw assembly constructed in accordance with the present invention;

FIGURE 5 is an end elevational view, partly in section, looking approximately in the direction of the arrows 5—5 of FIGURE 4; and FIGURE 6 is a longitudinal sectional view, partly in elevation and partly broken away, showing still another alternative embodiment of a pre-loaded ball screw assembly constructed in accordance with the present invention.

Figure 1:
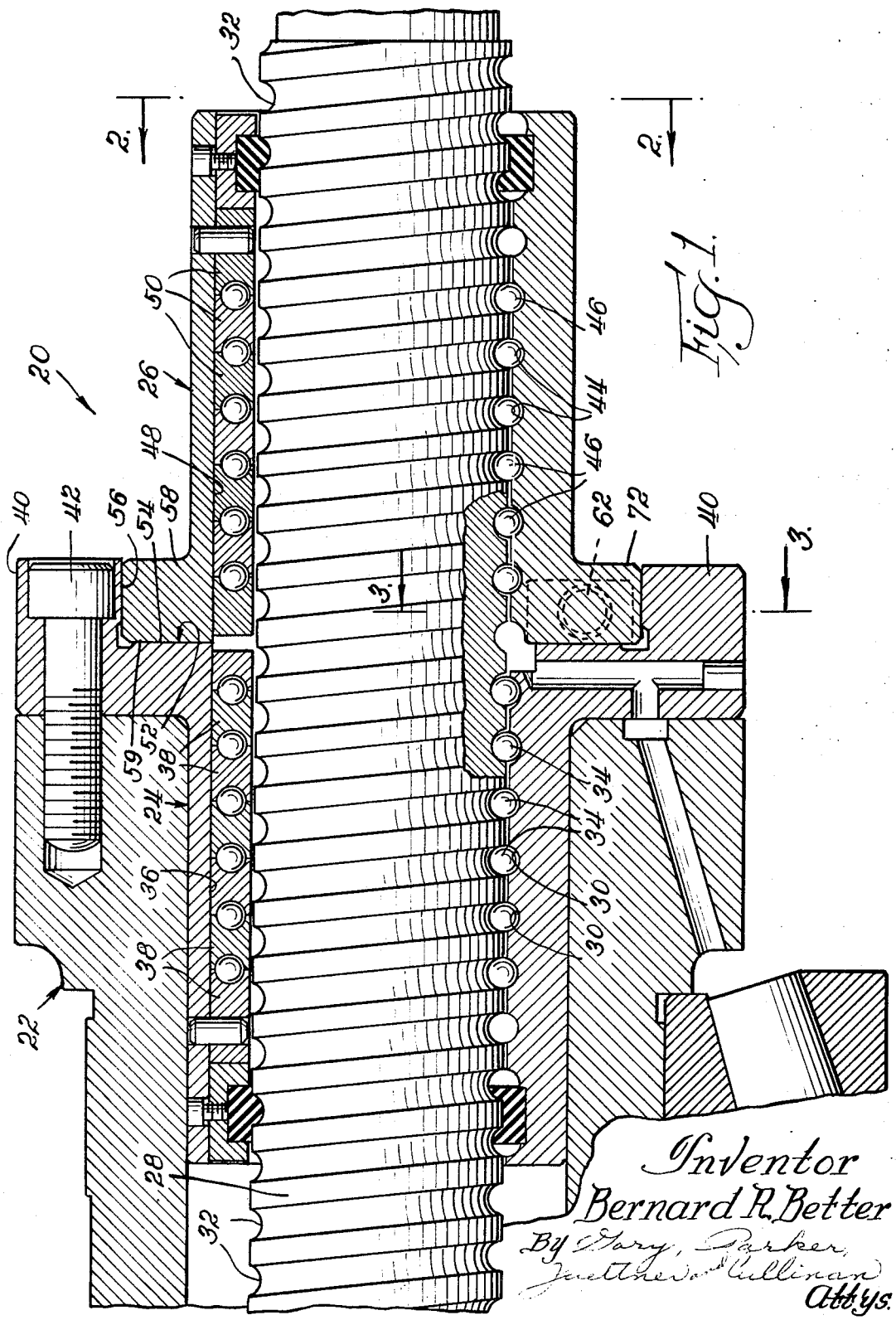
FIGURE 1 is a longitudinal sectional view, partly broken away, taken substantially along the line 1—1 of FIGURE 2, showing a pre-loaded ball screw assembly constructed in accordance with the teachings of the present invention.
Figure 2:
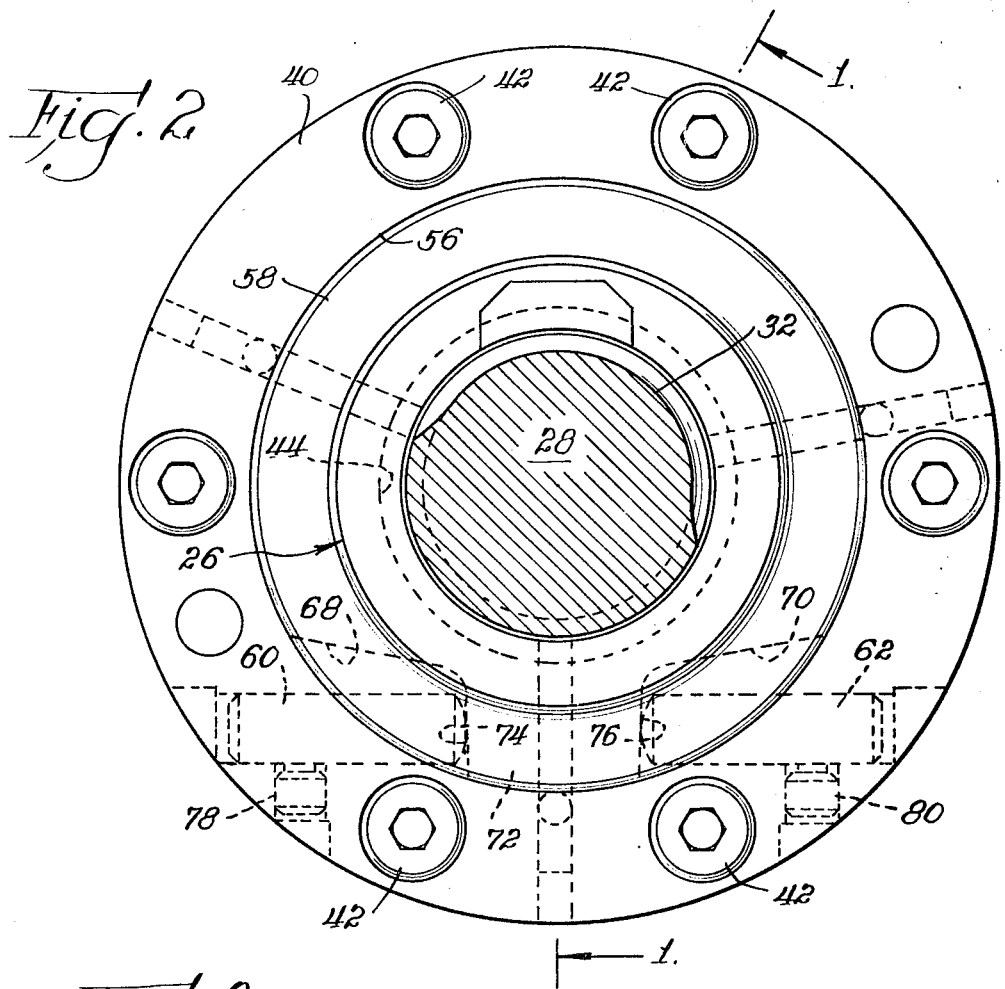
FIGURE 2 is an end elevational view, partly in section, looking approximately in the direction of the arrows 2—2 of FIGURE 1.
Figure 3:
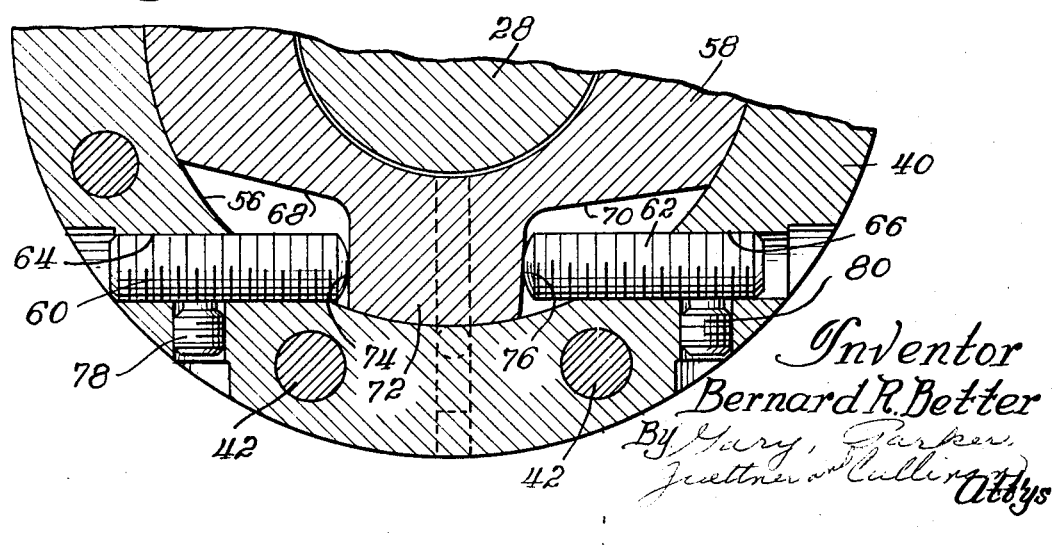
FIGURE 3 is a fragmentary transverse sectional view taken substantially along the line 3—3 of FIGURE 1.

Referring now to the drawings, and in particular to FIGURES 1–3, there is shown a ball screw assembly 20 comprising a housing 22, a first nut member 24, a second nut member 26, and a screw member 28. The nut 24 is provided with an internal helical groove 30, and the screw 28 extends axially through the nut member 24 and has an external helical groove 32 formed thereon. The screw groove 32 together with the groove 30 in the nut 24 define helical passages or ball circuits in which a plurality of balls 34 circulate so as to interconnect the screw and nut members. In the particular embodiment being described, the nut member 24 has an internal longitudinal slot 36 formed therein, and a plurality of ball return inserts 38 are positioned in side-by-side relation in the slot. Each ball return insert 38 has a portion of a cross-over groove formed in opposite sides thereof, whereby when the several inserts are disposed in side-by-side relation each groove portion cooperates with an adjacent complementary groove portion to define a crossover groove or ball return passage for a corresponding ball circuit. In the embodiment illustrated there are seven ball return inserts provided in the nut member 24 so as to form six independent ball circuits for interconnecting the nut with the screw member 28. A more complete description of the structure and mode of operation of the ball return inserts 38 will be found in the copending application of Joseph W. Kosinski, Ser. No. 375,446, filed June 16, 1964, now Patent No. 3,301,082, and assigned to the assignee of the present invention. However, the foregoing structure is described here merely by way of example and it should be understood that the present invention is not limited to any particular number of ball circuits or to any particular type of ball return mechanism.

The nut member 24 has a radial flange portion 40 which bears against the end of the housing 22, and a plurality of circumferentially spaced screws 42 extend through the flange 40 into the end of the housing so as to rigidly interconnect the nut 24 with the housing 22. The second nut member 26 is provided with an internal helical groove 44 and is mounted over the screw 28 in end-to-end relation with the first nut 24 so that the screw groove 32 together with the groove 44 in the nut 26 define six independent helical passages or ball circuits in which a plurality of balls 46 circulate so as to interconnect the screw with the nut 26. The nut 26 also includes an internal longitudinal slot 48 in which a plurality of ball return inserts 50 are disposed in side-by-side relation to define a crossover groove or ball return passage for each of the several ball circuits.

The radial flange 40 of the nut 24 has a circular recess 52 formed in the end face thereof, the recess being defined by a base portion 54 and an annular wall 56. In addition, the second nut member 26 is provided with a radial flange 58 which is dimensioned so as to fit within the recess 52. Accordingly, the nut 26 may be rotated on the screw 28 relative to the nut 24 so as to locate the flange 58 on the nut 26 within the recess 52 formed in the flange 40 of the nut 24 as shown in FIGURE 1 and thereby cause the end face 59 of the flange 58 to bear against the base 54 of the recess in the flange 40. It will be understood that by such rotation of the second nut member 26 against the end of the first nut member 24, a certain pressure is developed at the interface between the surfaces 54 and 59 which, as viewed in FIGURE 1, urges the nut 24 to the left and the nut 26 to the right relative to the common screw member 28. It will further be understood that the magnitude of such pre-load forces may be varied by changing the rotational position of the two nut members relative to one another.

As best shown in FIGURES 2 and 3, the flange portion 40 of the first nut member 24 carries a pair of oppositely disposed adjusting screws 60 and 62 which are positioned in threaded holes 64 and 66 formed in the flange 40 so that their inner ends project into the recess 52 provided in the end face of the flange 40. The flange 58 on the second nut member 26 is cut away as shown at 68 and 70 so as to form a projecting tongue 72 which extends between the ends of the two adjusting screws 60 and 62 and has flat side walls or ledges 74 and 76 against which the screws are adapted to engage. Thus, the two adjusting screws 60 and 62 are carried by the flange portion 40 of the first nut member 24 and their inner ends project into the recess 52 in which the flange portion 58 of the second nut member 26 is disposed so that the screws may engage against the oppositely disposed side surfaces or ledges 74 and 76 on the flange 58.

It will be understood from the foregoing that by rotating one of the adjusting screws 60 and 62 outwardly a slight amount, and then rotating the other screw inwardly a corresponding amount, it is possible to rotate the second nut member 26 a slight amount relative to the first nut member 24 and thereby vary the pressure at the interface between the surfaces 54 and 59 so as to adjust the pre-load forces on the two nuts. It will be seen that set screws 78 and 80 are mounted in threaded passages transverse to the holes 64 and 66 and in communication therewith so as to be movable into engagement with the adjusting screws 60 and 62 for locking the latter in a given position and thereby locking the relative rotational position of the two nut members 24 and 26. It will be seen that FIGURE 3 shows the tongue 72 on the second nut 26 rotated a slight amount in a clockwise direction from the position of FIGURE 2 by threading of the screw 60 outwardly and the screw 62 inwardly a corresponding amount.

FIGURES 4 and 5 show an alternative embodiment of the invention comprising a ball screw assembly 82 including a housing 84 and a pair of nut members 86 and 88. The housing 84 comprises a body portion 90 having a bore 92 for receiving the two nut members, and a flange portion 94 which is provided with a plurality of mounting holes 96. The first nut member 86 comprises a body portion 98 which fits within the bore 92 of the housing 84, and a radial flange portion 100 which abuts against an end face 102 of the housing and is rigidly connected thereto by a plurality of screws 104. The second nut member 88 includes a body portion 106 which fits within the housing bore 92, and a radial flange portion 108 which is cut away at 110 and 112 as shown in FIGURE 5 to provide a pair of flat ledges or abutment surfaces 114 and 116.

The housing flange 94 has a circular recess 118 formed in the right-hand end surface thereof as viewed in FIGURE 4, the recess being defined by a base 120 and an annular wall 122. The second nut member 88 is positioned with its body portion 106 disposed within the housing bore 92 and with its flange portion 108 located within the recess 118 so that an inner flange wall 124 abuts against the base 120 of the recess. A common screw member 126 extends through the two nut members 86 and 88 and is interconnected with each of such nut members by a plurality of ball circuits which may be of the type described in conjunction with the embodiment of FIGURES 1–3. The adjacent ends of the two nut members 86 and 88 are spaced apart somewhat within the housing bore 92 and thus do not abut in order to produce a pre-load as in the first embodiment described hereinabove. However, by rotating the second nut member 88 relative to the housing 84 it is possible to develop pressure at the interface between the nut flange wall 124 and the base 120 of the housing recess 118 so as to develop a pre-load force on the nut 88 which urges the latter to the right relative to the screw 126 as viewed in FIGURE 4. Moreover, such rotation of the nut 88 exerts a pull on the screw member 126 so as to develop a pressure at the interface between an inner face 128 on the flange portion 100 of the first nut member 86 and the end surface 102 of the housing. In this manner, a pre-load force is developed which urges the first nut member 86 to the left relative to the screw 126 as viewed in FIGURE 4.

In the above-described embodiment, it will be apparent that the pre-load forces on the nuts 86 and 88 can be adjusted by a slight rotation of the nut member 88 relative to the housing 84. As best shown in FIGURE 5, a pair of adjusting screws 130 and 132 are mounted in threaded holes 134 and 136 formed in the housing flange 94. The two adjusting screws 130 and 132 are parallel to one another and they extend into the recess 118 so that the screw 130 abuts against the flat ledge 114 formed on the flange 108 of the nut 88 and the screw 132 abuts against the second ledge 116. Accordingly, the two screws 130 and 132 hold the nut 88 in a given rotational position relative to the housing 84, and by threading one of the screws outwardly a slight amount and the other inwardly a corresponding amount it is a simple matter to vary such rotational position and in this manner adjust the magnitude of the pre-load on the nuts 86 and 88. The housing flange 94 also includes a pair of threaded holes 138 and 140 which are perpendicular to and intersect the threaded holes 134 and 136, and a pair of set screws 142 and 144 are disposed in the holes 138 and 140 and serve to lock the adjusting screws 130 and 132 so as to prevent any accidental change in the magnitude of the pre-load forces.

FIGURE 6 shows still another embodiment of the present invention comprising a ball screw assembly 146 including a housing 148 and a pair of nut members 150 and 152. The housing 148 is provided with a bore 154 for receiving the two nut members in end-to-end abutted relation. The first nut member 150 includes a body portion 156 which is disposed within the housing bore 154, and a flange portion 158 which bears against an end face 160 of the housing. The nut flange 158 is rigidly secured to the housing 148 by a plurality of circumferentially spaced screws 162 so as to prevent any rotation of the nut 150 relative to the housing. The second nut member 152 is disposed within the housing bore 154 so that an end face 164 thereof abuts against an end face 166 on the first nut member 150. A common screw member 168 extends through the two nut members 150 and 152 and is interconnected with such nut members by a plurality of ball circuits which may be of the type described in conjunction with the embodiment of FIGURES 1–3.

It will be understood that by rotating the second nut member 152 on the screw 168 relative to the housing 148 it is possible to develop pressure at the interface between the two end surfaces 164 and 166 of the two nut members 150 and 152. In this manner, a pre-load force is developed which urges the first nut 150 to the left relative to the screw 168 as viewed in FIGURE 6, and urges the second nut 152 to the right relative to the screw. Such pre-load forces can be adjusted by a slight rotation of the nut member 152 relative to the housing 148 so as to vary the pressure at the interface where the two nuts abut one another. FIGURE 6 shows an adjusting screw 170 which is threaded through the wall of the housing 148 so as to abut against a ledge 172 formed by cutting away a portion of the nut 152 at the inner end thereof. It will be understood that a second adjusting screw may be provided at the opposite side of the housing generally as shown in the embodiment of FIGURE 3 in order to provide for accurate adjustment of the rotational position of the nut 152 relative to the housing 148 and thereby provide for fine adjustment of the magnitude of the pre-load forces on the nuts 150 and 152. It will be seen that the ball screw assembly of FIGURE 6 is similar to the embodiment of FIGURE 4 insofar as it comprises a pair of nuts both of which are disposed in a common housing. However, in the embodiment of FIGURE 4 the nuts press against the ends of the housing, whereas in the embodiment of FIGURE 6 the two nuts have their ends abutted against one another.

It will be seen that the several embodiments described hereinabove fully accomplish the earlier stated objectives of the present invention. The magnitude of the pre-load forces can be adjusted by simply rotating one of the adjusting screws so as to thread the same outwardly a small amount, and then rotating the other adjusting screw to thread it inwardly thereby rotating the corresponding nut member until one of the ledges or flats formed thereon is again abutted firmly against the first-mentioned adjusting screw. Since the adjusting screws may be rotated by extremely small amounts if desired, and inasmuch as the pitch of the threads thereon may be selected to provide the desired sensitivity of adjustment, it is possible with the ball screw assembly of the present invention to effect adjustment of the pre-load forces in very fine increments. Such adjustments can be made without removing the screw member or otherwise disassembling the ball screw device, and the numerous problems incident to fitting spacer washers or shims or the like between the two nut members are entirely eliminated. The novel pre-loading apparatus described herein also eliminates the problem of inserting the screw member under load. That is, in many prior art devices the two nuts are first fixed in predetermined relative positions, and thereafter the screw member is inserted at which time the screw develops the pre-load on the nuts. With the device of the present invention the pre-load is developed only after the screw has been assembled within the nut members. The present invention not only greatly simplifies adjustment of the pre-load forces in the field, but it reduces the original cost of manufacture by substantially reducing the time and effort required to make the initial pre-load setting. Moreover, by being able to control the pre-load forces accurately and in an exceptionally simple manner, it becomes practical to adjust the pre-load in order to obtain optimum performance from a ball screw assembly regardless of the particular application for which it is being used.

While I have described my invention in certain preferred forms, I do not intend to be limited to such forms, except insofar as the appended claims are so limited, since modifications coming within the scope of my invention will readily occur to those skilled in the art, particularly with my disclosure before them.

I claim:

1. In a ball screw assembly, the improvement comprising, in combination, a screw member, a pair of nut members mounted on said screw member and each interconnected therewith by at least one corresponding ball circuit, a housing, said nut members being disposed within said housing and in a predetermined rotary position on said screw member relative to one another to develop counteracting axial pre-load forces on said nut members urging the same in opposite directions relative to said screw member, one of said nut members being rigidly affixed to said housing and the other of said nut members being rotatably adjustable relative to said one nut member and said housing, and adjusting screw means carried by said housing and positioned for engagement with said other nut member for controlling the rotary position of said other nut member relative to said one nut member and said housing, said adjusting screw means being manually rotatable in small increments for varying said rotary position of said other nut member relative to said one nut member and said housing and thereby adjusting the magnitude of said pre-load forces in corresponding increments.

2. The invention of claim 1 where said adjusting screw means comprises a pair of first and second adjusting screws both of which act on said other nut member to hold the same in a given rotary position relative to said one nut member and said housing, said first adjusting screw being withdrawn and said second adjusting screw being advanced in order to rotate said other nut member a small increment in one direction relative to said one nut member and said housing to increase the magnitude of said pre-load forces a corresponding increment, and said second adjusting screw being withdrawn and said first adjusting screw being advanced in order to rotate said other nut member a small increment in an opposite direction relative to said one nut member and said housing to decrease the magnitude of said pre-load forces a corresponding increment.

3. The invention of claim 1 wherein said housing has a recess formed in one end and said other of said nut members has a first flange formed on one end thereof which is disposed in said recess and engaged against a base portion of the recess, and wherein said adjusting screw means is carried by said housing and positioned so as to project into said recess in engagement with said first flange for controlling the rotary position of said other nut member relative to said one nut member and said housing.

4. The invention of claim 3 where a second flange is formed on said one nut member and the latter flange is engaged against an end of said housing opposite said recess, whereby each of said first and second flanges bears against a respective end of said housing and in effect clamp the latter therebetween to develop said counteracting axial pre-load forces on said nut members.

5. The invention of claim 1 where said other nut member is disposed within said housing with its end in abutment with the end of said one nut member so as to produce a pressure at their abutting interface and thereby develop said counteracting axial pre-load forces on said nut members, and where said adjusting screw means extends through a wall of said housing into engagement with said other nut member for controlling the rotary position thereof relative to said one nut member and said housing.

6. In a ball screw assembly, the improvement comprising, in combination, a screw member, a pair of nut members mounted on said screw member and each interconnected therewith by at least one corresponding ball circuit, said nut members being in a predetermined rotary position on said screw member relative to one another to develop counteracting axial pre-load forces on said nut members urging the same in opposite directions relative to said screw member, adjusting screw means carried by said ball screw assembly and positioned for engagement with one of said nut members for controlling the rotary position of said one nut member relative to the other nut member, said adjusting screw means comprising a pair of first and second adjusting screws both of which act on said one nut member to hold the same in a given rotary position relative to said other nut member, said first adjusting screw being withdrawn and said second adjusting screw being advanced in order to rotate said one nut member a small increment in one direction relative to said other nut member to increase the magnitude of said pre-load forces a corresponding increment, and said second adjusting screw being withdrawn and said first adjusting screw being advanced in order to rotate said one nut member a small increment in an opposite direction relative to said other nut member to decrease the magnitude of said pre-load forces a corresponding increment, and a projecting tongue portion on said one nut member, said first and second adjusting screws being approximately coaxial and engageable against opposite sides of said tongue portion to adjustably control the rotary position of said one nut member relative to said other nut member.

7. In a ball screw assembly, the improvement comprising, in combination, a screw member, a pair of nut members mounted on said screw member and each interconnected therewith by at least one corresponding ball circuit, said nut members being disposed in end-to-end abutting relation and in a predetermined rotary position on said screw member relative to one another so as to produce a pressure at their abutting interface and thereby develop counteracting axial pre-load forces on said nut members urging the same in opposite directions relative to said screw member, adjusting screw means carried by one of said nut members and positioned for engagement with the other of said nut members for controlling the rotary position of said other nut member relative to said one nut member, said adjusting screw means being manually rotatable in small increments for varying said rotary position of said other nut member relative to said one nut member and thereby adjusting the magnitude of said pre-load forces in corresponding increments, and each of said nut members having a flange at one end thereof, said nut members being disposed with said flanges in abutting relation.

8. The invention of claim 7 where a first one of said flanges has a recess formed in an end face thereof, and a second one of said flanges is disposed in said recess in engagement with a base portion of the recess.

9. The invention of claim 8 where said second flange has a pair of abutment surfaces thereon, and where said adjusting screw means comprises a pair of first and second adjusting screws carried by said first flange, said pair of adjusting screws being positioned so as to project into the recess in said first flange and into engagement with said abutment surfaces on said second flange, said first adjusting screw being withdrawn and said second adjusting screw being advanced in order to rotate said other nut member a small increment in one direction relative to said one nut member to increase the magnitude of said pre-load forces a corresponding increment, and said second adjusting screw being withdrawn and said first adjusting screw being advanced in order to rotate said other nut member a small increment in an opposite direction relative to said one nut member to decrease the magnitude of said pre-load forces a corresponding increment.

References Cited

UNITED STATES PATENTS

| | | | |
|---|---|---|---|
| 2,498,897 | 2/1950 | Riedel | 74—441 |
| 2,714,821 | 8/1955 | Orner | 74—459 |
| 2,959,976 | 11/1960 | Zankl | 74—441 |
| 3,198,029 | 8/1965 | Orner | 74—459 |

FRED C. MATTERN, Jr., *Primary Examiner.*

LEONARD H. GERIN, *Assistant Examiner.*